(12) United States Patent
Fablet et al.

(10) Patent No.: US 8,954,457 B2
(45) Date of Patent: Feb. 10, 2015

(54) METHOD FOR PROCESSING A STRUCTURED DOCUMENT TO RENDER, AND CORRESPONDING PROCESSOR

(75) Inventors: Youenn Fablet, La Dominelais (FR); Romain Bellessort, Rennes (FR); Hervé Ruellan, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

(21) Appl. No.: 13/495,773

(22) Filed: Jun. 13, 2012

(65) Prior Publication Data

US 2012/0330984 A1    Dec. 27, 2012

(51) Int. Cl.
*G06F 17/30*    (2006.01)
*G06F 17/22*    (2006.01)
*G06F 17/27*    (2006.01)

(52) U.S. Cl.
CPC ........ *G06F 17/2247* (2013.01); *G06F 17/2765* (2013.01); *G06F 17/3092* (2013.01)
USPC ........................................................ 707/757

(58) Field of Classification Search
CPC .......... G06F 17/30911; G06F 17/2264; G06F 17/272; G06F 3/1246; G06F 17/2247; G06F 17/24; G06F 17/30905; G06F 17/30961
See application file for complete search history.

(56) References Cited

U.S. PATENT DOCUMENTS

| | | | | |
|---|---|---|---|---|
| 7,913,163 | B1* | 3/2011 | Zunger | 715/243 |
| 2006/0150083 | A1* | 7/2006 | Jazdzewski et al. | 715/513 |
| 2007/0113177 | A1* | 5/2007 | Fablet | 715/530 |
| 2008/0098412 | A1* | 4/2008 | Zhou et al. | 719/328 |
| 2008/0120626 | A1 | 5/2008 | Graffagnino et al. | |
| 2010/0153837 | A1* | 6/2010 | Bellessort et al. | 715/234 |
| 2010/0287184 | A1* | 11/2010 | Schwartz | 707/769 |
| 2011/0153630 | A1* | 6/2011 | Vernon et al. | 707/758 |
| 2012/0102392 | A1* | 4/2012 | Reesman et al. | 715/243 |

FOREIGN PATENT DOCUMENTS

WO    2005/043327 A2    5/2005

OTHER PUBLICATIONS

Christopher Grant Jones, Rose Liu, Leo Meyerovich, Krste Asanovic, Rastislav Bodik Department of Computer Science, University of California Berkeley, "Parallelizing the Web Browser" (Mar. 6, 2009) pp. 1-6 (Webpage and preprint).
http://taligarsiel.com/Projects/howbrowserswork1.htm (accessed on Jun. 11, 2012) pp. 1-26.

* cited by examiner

*Primary Examiner* — Yuk Ting Choi
(74) *Attorney, Agent, or Firm* — Canon USA, Inc., IP Division

(57) ABSTRACT

The present invention concerns a method for processing a structured document to render, such as XML or HTML files. The method comprises the steps of: parsing the structured document into parsed tokens TK of structured data; constructing a first tree structure DTree storing the structured data of parsed tokens; constructing a render tree structure RTree storing the document content to render, said render tree structure being synchronized with the first tree structure; rendering the structured document based on the render tree structure RTree; wherein constructing the first tree structure DTree comprises deciding, for each parsed token TK, whether or not the parsed token is to be stored in said first tree structure, and storing the structured data of the parsed token therein only in case of positive decision. Partial first (DOM) tree DTree is therefore stored in memory, reducing memory use and processing time before rendering the structured document.

27 Claims, 8 Drawing Sheets

```
<html>
<head>
  <meta ...>
</head>
  <body>
    <h2>SVG with HTML</h2>
    <svg width="500" xmlns="http://www.w3.org/2000/svg">
      <circle r="100" cx="100" cy="100" />
    </svg>
  </body>
</html>
```

Figure 3a

```
<html>
  <body onLoad="fillBody()">
  </body>
  <script>
  function fillBody() {
    var h1 = this.document.createElement("h1");
    ...
  }
  </script>
</html>
```

Figure 3b

```
<html>
  <body onLoad="updateBody()">
    <h1>Usual content</h1>
    <svg width="500" xmlns="http://www.w3.org/2000/svg">
      <circle r="100" cx="100" cy="100" />
    </svg>
    <div id='dynamicDataContainer1'> ... </div>
    <div id='dynamicDataContainer2'> ... </div>
  </body>
  <script>
  function updateBody() {
  var client = new XMLHttpRequest();
  client.open(« GET", "/status");
  ...
  }
  </script>
</html>
```

Figure 3c

```
<html domBuilding='0'>
<head>
  <meta ...>
</head>
  <body>
    <h2>SVG with HTML</h2>
    <svg width="500" xmlns="http://www.w3.org/2000/svg">
      <circle r="100" cx="100" cy="100" />
    </svg>
  </body>
</html>
```

Figure 4a

```
<html domBuiliding='1'>
  <body onLoad="fillBody()">
  </body>
  <script>
  function fillBody() {
    var h1 = this.document.createElement("h1");
    ...
  }
  </script>
</html>
```

Figure 4b

```
<html>
  <body onLoad="updateBody()">
    <h1>Usual content</h1>
    <svg width="500" xmlns="http://www.w3.org/2000/svg"
          domBuilding="0">
      <circle r="100" cx="100" cy="100" />
    </svg>
    <div id="dynamicDataContainer1" domBuilding="1"> ... </div>
    <div id="dynamicDataContainer2" domBuilding="2"> ... </div>
  </body>
  <script>
  function updateBody() {
   var client = new XMLHttpRequest();
   client.open("GET", "/status");
   ...
  }
  </script>
</html>
```

Figure 4c

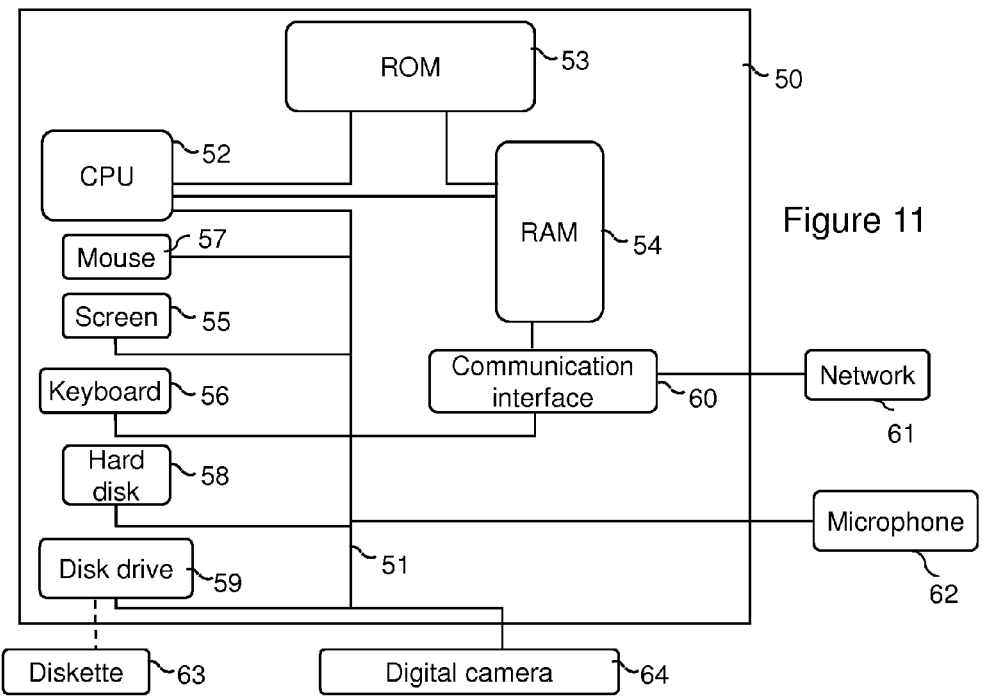

METHOD FOR PROCESSING A STRUCTURED DOCUMENT TO RENDER, AND CORRESPONDING PROCESSOR

FIELD OF THE INVENTION

The present invention concerns a method for processing a structured document to render.

A particular but non-exclusive application of the present invention regards the browsing of HTML (standing for "HyperText Markup Language") web pages, in particular when they are compressed in a binary format such as EXI (standing for "Efficient XML Interchange").

BACKGROUND OF THE INVENTION

Nowadays, structured documents are widely used, in particular on the World Wide Web.

HTML, SVG (standing for "Scalable Vector Graphics") and XML are examples of markup language used to create such structured documents.

The XML format is a syntax for defining computer languages, which makes it possible to create languages adapted to different uses which may however be processed by the same tools.

An XML document is composed of elements, each element being delimited by an opening tag (or start tag) comprising the name of the element (for example: <tag>) and a closing tag (or end tag) which also comprises the name of the element (for example </tag>). Each element may contain other elements in a hierarchical child-parent relationship and/or contain text data or value defining content. Given these structure tags, data in such a document is referred to as "structured data".

The definition of an element may also be refined by a set of attributes, each attribute being defined by a name and having a value. The attributes are then placed in the start tag of the element they are refining (for example <tag attribute="value">).

XML syntax also makes it possible to define comments (for example: "<!—Comment—>") and processing instructions, which may specify to a computer application what processing operations to apply to the XML document (for example: "<?myprocessing?>").

Several different languages based on the XML language may contain elements of the same name. To be able to mix several different languages, an addition has been made to XML syntax making it possible to define "Namespaces". Two elements are identical only if they have the same name and are situated in the same namespace. These two elements are then said to have the same "qualified name".

In XML terminology, the set of the terms "element", "attribute", "text data", "comment" and "processing instruction" are grouped together under the generic name of "item".

XML items, and more generally structured items, comprise two kinds of information: on the one hand, structure information which includes information defining the structure of the items, for example opening and closing tags or the attribute names; and on the other hand, content information or "value" corresponding to the value taken by the items, for example the value of an attribute or the text data of an element.

To process an XML document, it must be read into memory. However, more than one reading approach exist.

A first family of reading approaches consists in reading the XML document as a sequence of events, processing one event at a time.

Each XML item is described in terms of events, namely XML events. Some events only refer to structure information of the item, for example the opening tag, the closing tag, a comment tag, etc. Other events only refer to content information of the item, for example an attribute value or text data.

The methods of this family, such as for example the SAX API (standing for "Simple API for XML"), allow the XML document to be read by streaming, enabling use of little memory space. However, easy access to any desired part of the data is not provided by these approaches.

A second family of reading approaches consists in representing all the structured data of the XML document in memory as a hierarchical tree-like data structure. An example of such structure, also referred to as "tree structure" or "tree data structure" or "tree" in the following description, is the DOM tree (standing for "Document Object Model").

The methods of this family generally enable easy and fast access to each part of the XML document. However, they require a large amount of memory to store all the structured data simultaneously.

The DOM format is a set of specifications of the W3C describing a model for representing XML data in the form of a tree. The tree is generally formed from nodes to which elements of the document correspond, the hierarchy of the nodes being in accordance with the hierarchy of the elements within the XML document. This hierarchy defines the concept of parent node/element—child node/element.

Each node moreover possesses a set of properties making it possible to store in memory for example the attributes relative to the corresponding XML element of the node or to provide functionalities specific to the DOM specification via libraries of functions. Thus, several XML events may be grouped together in the same DOM node (for example the start element event and the events relative to all the attributes of that element). An example of structuring of the nodes is documented in the DOM recommendation.

Contrary to the model for processing by stream (StAX or SAX) in which the data are presented event by event, the structured data of an XML document are, in the DOM interface, entirely placed in memory in the DOM tree. The API interfaces of DOM type thus make it possible to rapidly access any element of structured data.

In accordance with the DOM recommendation, the representation in DOM tree form gives numerous functionalities for paths or for manipulation of the nodes of the tree, such as:
  each element may directly access all its direct children and all its attributes;
  a function enables access to all the elements having the same qualified name;
  a function, known by the name of "mutation event", gives notification of the modifications of a DOM tree. Such modifications of tree nodes are thus easily identified. These mutation events make it possible to call functions on modifying the DOM tree, in particular the insertion or the deletion of an element, an attribute or a text node; or the modification of the value of an attribute or of a text node.

To overcome the main drawback of XML syntax which is to be verbose, methods of compressing and encoding an XML document exist, resulting in compressed documents having a reduced size.

This is in particular the case for the Binary XML formats that produce binary bitstream.

Advanced mechanisms, such as some involved in EXI and Fast Infoset Binary formats, use indexing tables (for example grammars) to represent the structure information into a compact way and also use specific codecs and indexation techniques to encode efficiently the content or values of the structured data.

While the structured data is generally encoded linearly, EXI provides two specific compression modes that rearrange the values within the EXI bitstream before encoding, so that similar values are stored next to the other: a mode referred to as "pre-compression" and a mode referred to as "compression", which distinguish from each other by the additional implementation for the "compression" mode of a final lossless compression algorithm (DEFLATE).

Rearrangement of the values reduces entropy of the data by grouping together similar information, and thus better compression of the XML data is obtained.

This involves:
grouping the XML event structure information, while keeping the original order of the original structured data, to obtain a structure channel,
grouping the XML event content information (values, names, etc.) relating to the same structure information (i.e. having the same qualified name [qname], such as the same element name or attribute name) to obtain a respective plurality of value channels. In each value channel, the values are kept in the original order of the values in the original structured data,
putting the value channels in order according to the corresponding structure information (i.e. the structure channel), that is to say in the order of the first occurrences in the original XML data of the associated qualified names,
encoding the structure channel and then the value channels in the resulting order. The values are encoded one after the other in each value channel, and the value channels are encoded one after the other. For each value channel, a local indexing table is used to index the values, possibly taking into account a type of the values (i.e. integer, float, string, etc.).

The HTML format relies on a restricted number of possible structural elements (structural semantics), defined in a standard.

HTML is used by web authors to define visual structure for content on the World Wide Web. The end user is presented with this content by viewing the content on a computer display, after the content has been rendered into a visual format by a web browser based on the HTML visual structure.

The values of the HTML elements are the content to render, while the values of the attributes may specify the rendering style, i.e. how this content has to be rendered and displayed (color, font, etc.).

HTML elements of a web page, originally defined in a static manner, now make reference to embedded scripts in languages such as Javascript which dynamically affect the behaviour of the web pages and then the rendering thereof. For example, based on the movement of the mouse in a web browser, the content of a web page may change.

Web browsers can also refer to Cascading Style Sheets (CSS) to define the appearance and layout of the content to render.

CSS define properties that are attached to categories of markup elements defined through CSS selectors and which guide the rendering of those elements.

CSS selectors select elements through different means, in particular based on the element name, element-specific attributes, like class or id or the parent element name.

A first CSS exemplary rule "h1{color:#00ff00}" matches against all 'h1' markup elements of the web page, for which it sets the text color property to green.

A second CSS exemplary rule "p.ex {color:#0000ff; margin-bottom:100px;}" matches against all 'p' markup elements that have the class attribute value equal to 'ex'. This rule sets the text color of those selected elements to blue and their bottom margin to 100 pixels.

An example of conventional processing by a web browser is illustrated in FIG. 1a, which shows a processor 1.

HTML data or any structured data 10 is input to a parser 12 which produces tokens, for example elements, items or events. All the parsed tokens are used by a DOM building unit 14 to generate a DOM tree in memory. The resulting DOM tree "DTree" strictly matches the structured data 10, in that it stores all the structured data of each parsed token, keeping the original structure.

Next, a render tree building unit 18 generates a render tree "RTree" from the DOM tree in memory and style sheets 16. Only the content of DOM nodes that have to be rendered are comprised in the render tree, taking into account the associated styles defined in the style sheets 16.

It is to be noted that generally the CSS selectors match to the DOM representation, providing an efficient attachment of CSS properties to the corresponding HTML elements.

A draw and display engine 20 then produces the rendering of the HML data on a display device, based on the render tree RTree.

The DOM tree DTree is used to store the HTML data to allow interactivity and dynamic behaviour of this HTML data in response to inputs from a user interacting with the displayed HTML data or to any network inputs. Since the DOM tree provides programmatic access functions (e.g. the above mentioned functionalities for path and for DOM tree manipulation), scripts such as Javascript can efficiently modify the HTML data within the DOM tree in response to the user or network inputs.

Modification of the DOM tree may comprise adding, removing, updating, moving, animating or hiding DOM nodes.

Each time the DOM tree is modified such that the rendering of the HTML data is also modified (i.e. the document content to render changes), the render tree RTree is correspondingly modified. To achieve this, it is provided for the render tree to be synchronized with the DOM tree.

FIG. 1b illustrates improved processing to render structured data. Parsing, DOM tree building and render tree building are parallelized (see branches 12-14-18, 12a-14a-18a and 12b-14b-18b). In particular, this is efficiently implemented in multi-core architectures wherein each core may process a single piece of the HTML data to render.

The HTML data 10 is split into several pieces, each piece being parsed in one of the parallelized branches to generate a partial DOM tree (not shown) and a partial render tree (not shown) in a similar manner to that described above with reference to FIG. 1a.

Once every piece of the HTML data 10 has been processed, a tree aggregator 19 is used to aggregate all the partial DOM trees into the DOM tree DTree representing the entire HTML data 10. Similarly, all the partial render trees are aggregated into the render tree RTree representing the content to render of the entire HTML data 10, taking into account the style sheets 16.

The draw and display engine 20 uses the RTree tree to render the HTML data content on the display device.

For example, the publication "Parallelizing the Web Browser", available at the web location http://usenix.org/events/hotpar09/tech/full_papers/jones/jones_html/, discusses parallelization for web page rendering.

When the structured data (HTML, XML, SVG, etc.) are provided in a compressed form (e.g. EXI), a third tree may be built when decompressing the data in order to build the DOM tree DTree, for example to store the structure channel and value channels of an EXI bitstream with compression mode, or the value types before obtaining the values.

Handling the two or three tree structures as described above requires a lot of computation and a significant amount of memory. The impact on computation and memory use is particularly high when processing complex structured data (complex web pages) or when the processor is part of a handheld device with limited resources. In particular, it may drain the battery of such a handheld device, or may cause slow display of the structured data.

It would therefore be desirable to improve the processing of structured data to render, with the aim of reducing the processing costs and possibly improving the rendering.

SUMMARY OF THE INVENTION

To that end, a first aspect of the invention relates to a method for processing a structured document to render as defined in the appended claims.

In particular, a processing method according to the invention may comprise the following steps:
  parsing the structured document into parsed tokens of structured data;
  constructing a first tree structure storing the structured data of parsed tokens;
  constructing a render tree structure storing the document content to render, said render tree structure being synchronized with the first tree structure;
  rendering the structured document based on the render tree structure,
  wherein constructing the first tree structure comprises deciding, for each parsed token, whether or not the parsed token is to be stored in said first tree structure, and storing the structured data of the parsed token therein only in case of positive decision.

The inventors have observed that parts of the DOM tree in memory are used or modified to a greater or lesser extent when the user interacts with the rendered and displayed document. In particular some parts are not modified at all.

An extreme case is a static structured document, the memorized DOM tree of which is never modified during user interaction.

The present invention has been developed based on these observations to enable construction of a partial DOM tree in which parts of the structural data of the document to render are not stored (e.g. the unused parts). This is achieved by implementing an additional step of deciding for each parsed token whether or not storing the corresponding structured data in the DOM tree, or "first tree structure", is merited.

For example, SVG documents that follow the SVG printing profile do not need a DOM tree to be built.

Thanks to the partial aspect of the first (DOM) tree (because it does not store all the structured data), memory for storing that tree is saved compared to conventional web browsing techniques.

Furthermore, due to partial construction of the first (DOM) tree, processing of the parsed token is reduced on average and the render tree is consequently built more rapidly, improving the display fluidity for the structured document.

Correlatively, a second aspect of the invention relates to a processor as defined in the appended claims. This may be a web browser processor used to render and display web pages.

In particular, a processor according to the invention may comprise:
  a parser configured to parse a structured document to render into parsed tokens of structured data;
  a tree structure building unit configured to construct a first tree structure storing the structured data of parsed tokens;
  a decision engine configured to decide, for each parsed token, whether or not the parsed token is to be stored in said first tree structure;
  a tree structure building unit configured to construct a render tree structure storing the document content to render, said render tree structure being synchronized with the first tree structure;
  a rendering engine configured to render the structured document based on the render tree structure,
  wherein the processor is configured to store the structured data of the parsed token in the first tree structure only in case of positive decision by the decision engine.

A third aspect of the invention relates to an information storage means, able to be read by a computer system, comprising instructions for a computer program adapted to implement the processing method as set out above, when the program is loaded into and executed by the computer system.

A fourth aspect of the invention relates to a computer program product able to be read by a microprocessor, comprising portions of software code adapted to implement the processing method as set out above, when it is loaded into and executed by the microprocessor.

The devices, the computer program and the information storage means may have features and advantages that are analogous to those set out above and below in relation to the methods for processing structured data to render.

A fifth aspect of the invention relates to a method for processing structured data to render substantially as herein described with reference to, and as shown in, FIG. 6; or FIGS. 6 and 7; or FIGS. 6 and 8; or FIGS. 6 and 9; or FIGS. 6 and 10 of the accompanying drawings.

Another aspect of the invention relates to a processor for processing structured data to render substantially as herein described with reference to, and as shown in, FIG. 2 of the accompanying drawings.

Optional features of the invention are further defined in the dependent appended claims.

In particular, it is provided that the method may further comprise, in response to receiving a request requiring access to structured data of a token missing from the first tree structure:
  retrieving the structured data of the missing token,
  updating the first tree structure to store the retrieved data of the missing token.

Such request (that is for example a query on a DOM tree) may result from user interaction with the rendered document, for example a mouse movement that triggers dynamic modification of the structured document stored in the first (DOM) tree.

This provision is advantageous because the decision not to store a parsed token may prove to be wrong, for example when it turns out that interaction requires this not-stored data. This provision then ensures that correction of this wrong decision is still possible by updating the partial first (DOM) tree when required.

According to a particular feature, the structured data of the missing token is retrieved from the render tree structure. Accessing the structured document again, which is demanding in terms of processing, is thus avoided.

In particular, such retrieving may be implemented for elements whose structured data only relates to rendering (e.g. content, style, etc.).

This is for example possible when, if it is decided not to store a parsed token in the first tree structure and the entire structured data of that missing parsed token is stored in the render tree structure, constructing the render tree structure comprises marking that structured data stored in that render tree structure as fully informed.

This is because, in this case, a decision for retrieving the structured data of the missing token from the render tree structure may be based on the presence of marking information associated with the structured data of the missing token in the render tree structure.

Providing marking information when constructing the render tree simplifies the operations for retrieving the structured data of tokens missing from the first (DOM) tree.

As a variant, the structured data of the missing token is retrieved directly from the structured document. This is a more conventional approach that ensures that any part of the structured document may be retrieved and loaded in the first (DOM) tree if needed.

For example, retrieving missing tokens is required when user interaction with the rendered document triggers modification of structured data not loaded and stored in the first (DOM) tree. Generally, modifying the structured data leads to modifying the rendering, in which case the render tree is synchronically modified.

In this respect, the method may further comprise updating the rendering of the structured document if the render tree structure is modified due to synchronization with the updated first tree structure.

In one embodiment, for each parsed token of structured data, the data stored in the first tree structure is complementary to the content information of the structured data stored in the render tree structure. When content information is present in the render tree structure for a parsed token (i.e. the content information stored is not null), the data stored in the first tree structure for that parsed token is marked as partially informed. This provision reduces memory use and enables fast retrieval of missing structured data, since each of the data is stored in one of the trees without duplication.

In one embodiment of the invention, the first tree structure and the render tree structure are separate independent structures. This means they are stored at two different memory locations.

It also means that the invention encompasses the case where they are dependent. For example, the first tree structure is stored within the render tree structure. Each node of the first (DOM) tree is stored at the corresponding node of the render tree.

In case the two trees are independent structures, the invention also provides that, for each token stored in the first tree structure, that structure comprises a node for every token that is structurally parent of said stored token. In this respect, the first (DOM) tree keeps the structure of the structured document.

In particular, the node of a parent token not stored (i.e. missing) in the first tree structure is an empty node marked as partially informed. This limits the amount of data to be stored to a minimum while keeping, in the first (DOM) tree, the exact structure of the structured document.

According to a particular feature, in the first tree structure, a parent node of a token not stored in that structure is marked as partially informed. Indeed, due to the partial aspect of the first (DOM) tree, some missing structured data may be required when another part is modified (e.g. by user interaction). This provision enables the processor to be quickly aware of the need to retrieve and load missing required structural data in the first (DOM) tree, when the parent node is modified.

In another embodiment of the invention, the render tree structure is constructed from the first tree structure for the tokens comprised therein and directly from the parsed tokens for the other tokens. This mixes a conventional approach wherein the render tree is built from the first (DOM) tree, and an unusual approach wherein a tree building unit is able to derive the data to actually render directly from the structured document, without using the first (DOM) tree.

However, in a preferable embodiment, the whole render tree structure is constructed directly from the parsed tokens. This means that the first (DOM) tree is not needed to build the render tree. In such a case, parallel processing of the two tree constructing steps may be implemented, resulting in producing the render tree more quickly. The rendering of the structured document is thus made more fluid.

In particular, the structured document is initially compressed in a structure channel and value channels; and the tokens are parsed from the structure channel. This applies for example in case of EXI bitstream encoding the structured document. The value corresponding to the parsed token may then be retrieved from the value channels.

According to a particular feature, the value channels group together values of structured data having the same qualified name, and the method further comprises disregarding a whole group of values from being stored in the render tree structure based on the corresponding qualified name. Processing time is thus saved at low cost.

According to another feature, the value channels group together values of the structured data of the structured document, and the method further comprises pre-processing a style sheet and associating a rendering style with a group of value channels at the same time. Therefore constructing the render tree is less demanding since style information is already available when retrieving the values of parsed tokens.

In yet another embodiment of the invention, the method further comprises:
monitoring use of nodes within the first tree structure during rendering (e.g. display) of the structured document; and
when the rendering of the structured document ends, removing structural data from unused monitored nodes of the first tree structure before storing that first tree structure in a cache memory.

The use of the nodes in the first (DOM) tree may reflect the modifications made to corresponding data structure due to user or network inputs (for example because of interaction with the rendered document).

The whole node of the structure may be removed if not used. However, in some cases (e.g. if a child element is used), the node is kept as empty and marked as partially informed. Only the structured data stored in that node is thus removed.

This configuration provides an optimized management of the cache memory. Cache memory is often used by browsers to be able to quickly render a web page that has already been accessed and rendered in the past.

Similarly, the method may further comprise:
monitoring use of nodes within the first tree structure during rendering (e.g. display) of the structured document; and
in response to receiving a request to reduce memory consumption, removing structural data from nodes of the first tree structure based on the monitored use.

For example, the unused nodes may be removed first, and then the less used nodes. Either a node is entirely removed, or only the structured data of the node is removed while keeping an empty node marked as partially informed (case of a parent node, the child nodes of which are used).

This provides an optimized management of the memory storing the tree structures. In particular, it is advantageous for handheld devices with low memory resources.

According to various embodiments, the deciding step may be based on various items of information, including the parsed token in question.

For example, the deciding step is based on an annotation associated with the parsed token in the structured document. This enables a fast deciding process since the information is directly available in the structured data, either in the parsed token or previously parsed. The annotation may be placed directly in the current element corresponding to the parsed token, but also in a parent element on which the current element depends.

Such annotation may be computed by a server hosting the structured document before it is accessed by a remote user handheld device.

In particular, the annotation may be an attribute, in the structured document, of an element comprising the structural data of the parsed token, said attribute specifying whether or not storing of the structural data of said element within the first tree structure is required. Deciding as to storing or not can be made directly on the basis of this annotation. In addition, using an attribute to specify the storing or not storing of information is very efficient at low cost since, thanks to the structural aspect of the document, a single annotation may be used for a plurality of tokens that refer to the same parent element.

According to a specific embodiment, the deciding step is based on an XPath expression included in the structured document that identifies structured data for which the corresponding token is required to be stored.

In a particular embodiment, the deciding step is based on heuristics performed on the structured document. For example, such heuristics may determine the elements of the document that are also referred to in the scripts embedded therein. This is because when a script is provided concerning a specific element, it is often the case that this element is bound to be modified in response to input from a user or a third party application.

In another implementation, the deciding step is based on the fact that all the structured data of the parsed token are also stored in the render tree structure. This is because it is not worth storing the same information twice. For example, such a situation occurs when all the information of structured data is used for the rendering of the corresponding content.

The deciding step may also be based on history information relating to a previous rendering of said structured document. For example, a list of the items that were modified in the DOM tree during the previous rendering may have been stored and then it may be used to define the items that are to be stored again for the new rendering.

According to a particular feature of the invention, the first tree structure comprises a document object model tree.

According to another particular feature of the invention, the structured document comprises a web document written in a markup language (e.g. XML or HTML).

The processor, information storage means and computer program have features and advantages that are analogous to those of the processing method.

BRIEF DESCRIPTION OF THE DRAWINGS

Still other particularities and advantages of the invention will appear in the following description, illustrated by the accompanying drawings, in which:

FIGS. 3a-3c represent various documents having content elements that are static and dynamic to different degrees;

FIGS. 4a-4c represent the same documents enriched with annotations used for implementation of the invention;

FIGS. 5a-5c illustrate another example of annotation in a structured document for implementation of the invention, based on XPath expressions;

FIG. 11 shows a particular hardware configuration of a device adapted for an implementation of the processing method according to the invention.

DETAILED DESCRIPTION OF EMBODIMENTS OF THE INVENTION

Figure 1A:
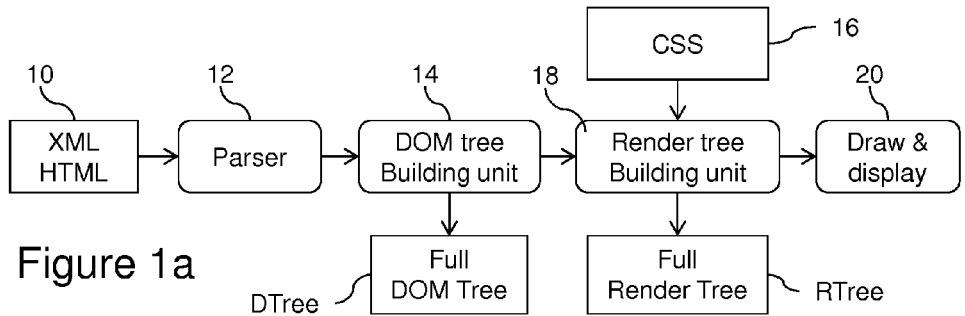
FIG. 1a schematically shows an example of conventional rendering processing by a web browser.
Figure 1B:
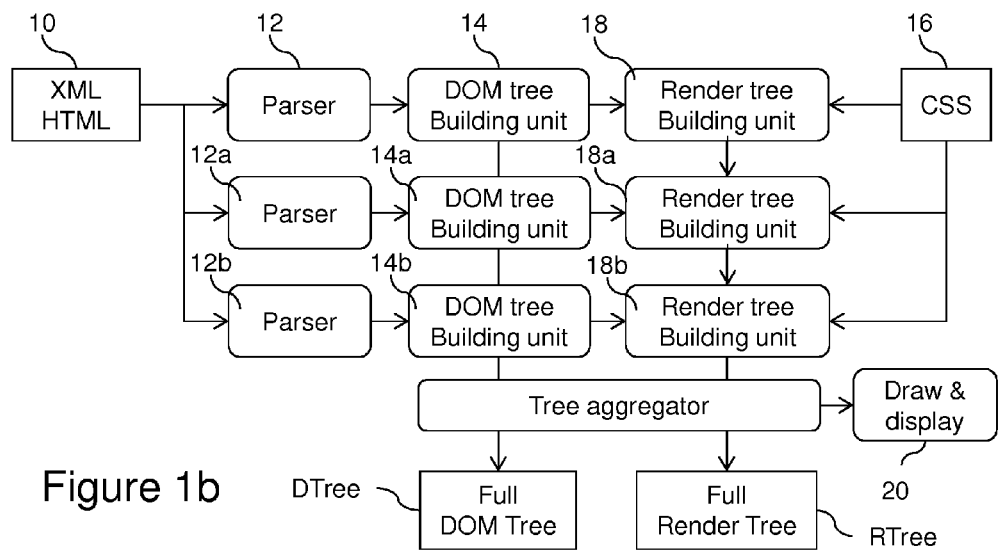
FIG. 1b schematically shows an example of rendering processing by a web browser with parallelization of rendering tasks.
Figure 2:
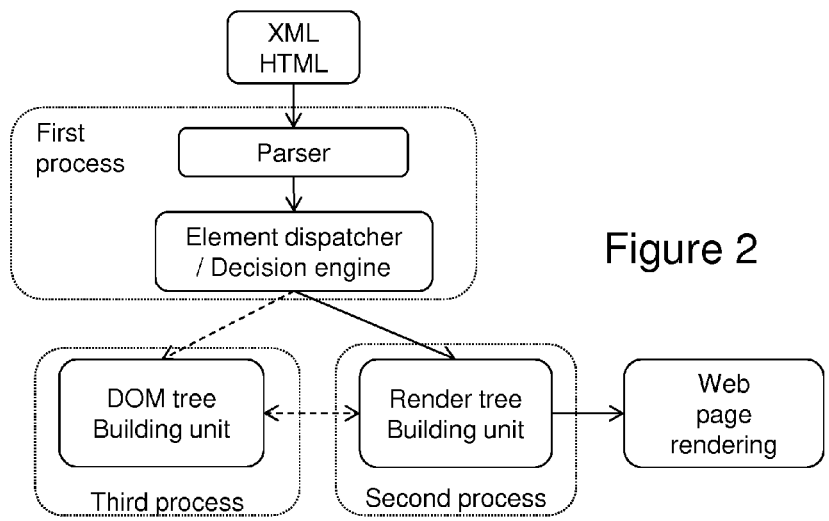
FIG. 2 illustrates an overview of a processor according to the invention.

FIG. 2 illustrates an overview of a processor 1 according to the invention for processing a structured document 10 of structured data to render, such as XML or HTML data.

First, the document 10 to render is input to a parser 12 which tokenizes the document into elements or "tokens" TK. Tokens may be XML or HTML events as defined above, a sequence of such events representing for example an XML or HTML element, or any set of elementary structured data of the document.

For the following description, it is considered that the token is a structured element of the document 10.

Based on the parsed element TK to process, an element or token dispatcher 13 comprising a decision engine decides whether that parsed element is to be sent to the render tree building unit 18 and/or to the DOM tree building unit 14.

The render tree building unit 18 selects the content to render from the parsed element TK, possibly enriched with style from CSS 16, and stores that content in the render tree RTree.

The DOM tree building unit 14 creates a DOM tree "DTree" storing the structured data of the document 10, keeping the same structure.

According to the invention, the parsed element TK is stored in the DOM tree DTree only in case of positive decision by the decision engine. In that case, the parsed element TK may be first transmitted to the DOM tree building unit 14 to build a DOM sub-structure representing that parsed element TK in the DOM tree DTree. Next, a corresponding render sub-structure is built from that built DOM sub-structure (using CSS 16 if needed) before being inserted into the render tree RTree.

In a variant, the parsed element TK is sent directly from the element dispatcher 13 to both the DOM tree building unit 14 and the render tree building unit 18. This situation permits parallelization of tree building in those two building units, and thus enables processing time savings in particular when processing in a multicore architecture.

Due to the decision process, there are parsed elements TK that are not sent to the DOM tree building unit 14 and are not then stored in the DOM tree DTree.

In this respect, the DOM tree is often partial compared to a conventional DOM tree used in the rendering of web pages. The DOM tree however keeps the structure of the document 10, despite the lack of some parsed elements. The invention enables less memory to be used for storing the DOM tree compared to conventional rendering tree-based approach.

Each parsed element TK for which the decision is negative is directly transmitted from the element dispatcher 13 to the render tree building unit 18 without transmission to the DOM tree building unit 14.

In another embodiment, since the render tree must be built, the parsed element TK may first be sent to the render tree building unit 18 before the decision to send it to the DOM tree building unit 14 is taken.

There is described below a way for the render tree building unit 18 to be able to build a render sub-structure directly from the parsed element TK, i.e. without using the DOM tree as conventionally done.

Once the render tree has been fully generated (i.e. for all the parsed elements TK), the whole structured document 10 is rendered to the user on a display device for example. This is done by the draw and display engine 20 based on the built render tree RTree.

As schematically represented in the Figure, three processes may be defined for the processing according to the invention: first, the element parsing; second, the render tree building; and third, the DOM tree building.

Those three processes can be advantageously executed in parallel since interactions between them always occur in one direction: the render tree building process always reads from either the DOM tree building process or from the element parsing process; and the DOM tree building process always reads from the element parsing process.

The amount of structured data that is stored in the end may considerably vary according to the original structured document 10. Some documents may require no DOM tree at all, while others may need a full DOM tree or a partial DOM tree. This is illustrated through FIGS. 3a-3c in the case of HTML documents.

FIG. 3a shows a document containing both HTML and SVG data that are hard-coded in the document. For this reason the document is said to be "static" and is bound not to be modified during its rendering. The DOM tree is therefore useless.

In that case, it is then preferable not to build the DOM tree at all, so as to reduce processor and memory use.

In contrast, FIG. 3b shows an HTML document 10 that is entirely dynamic. This is because data to render is generated programmatically when rendering the document (see the fillBody( ) function that is called to define the <body> of the web page upon loading that web page).

In that case, the DOM tree is needed since this is what is manipulated by the rendering application.

FIG. 3c shows what is a more usual HTML document 10. It contains both static and dynamic content. The SVG content is static and may not require any corresponding DOM sub-structure in the DOM tree. On the contrary, the <div> element contains dynamic content in which case a corresponding DOM tree representation would be useful to handle user interactivity on the rendered document.

There may be various information based on which the decision whether or not to store the parsed element TK into the DOM tree is taken. This information is however directly or indirectly (e.g. linked to a parent element) related to the parsed element TK to process, as illustrated in the following examples.

A straightforward and simple way to drive the deciding process is to use an annotation associated with the parsed element TK in the structured document 10. This annotation may have been provided therein by a server hosting the structured document before it is accessed by a remote user handheld device. Indeed, such a server has more processing resources to compute that information than user handheld devices.

The use of an annotation enables a fast decision process since the information is directly available in the structured data.

The annotation may be placed directly in the current element corresponding to the parsed token, but also in a parent element (even in the document root element) since the current element depends on it, and even at the document level in which case it would be applied to the whole document.

For instance, the decision engine 13 may know, thanks to the annotation, that a document to render follows a particular profile for which no DOM representation is actually required.

The annotation may also be an attribute, in the structured document, of an element comprising the structural data of the parsed token, said attribute specifying whether or not storing of the structural data of said element within the first (DOM) tree structure is required.

FIGS. 4a to 4c give example of use of that attribute, for the documents of respectively FIGS. 3a to 3c.

For the static document of FIG. 4a, a "domBuilding" attribute with a value of 0 is added to the root element since it applies to all the elements of the document.

Since the document of FIG. 4b is totally dynamic, the "domBuilding attribute" with a value of 1 is added also to the root element to state that the DOM tree is to be built for the whole document.

FIG. 4c shows such a situation where some elements contain specific attributes specifying that no DOM tree sub-structure (i.e. the DOM nodes corresponding to those elements) is actually needed (or the reverse) for the given elements. In the document of FIG. 4c, some structured elements need corresponding DOM tree sub-structures and some others do not need corresponding DOM tree sub-structures.

The <svg> element does not require a DOM tree sub-structure and, to that end, a "domBuilding" attribute with a value of 0 has been added to it. The decision engine, based on the parsed element, then directly decides not to store that element in the DOM tree.

On the other hand, the two <div> elements potentially require corresponding DOM tree sub-structures. A "domBuilding" attribute with a positive value is therefore added to each of them.

Since the DOM tree sub-structure of one <div> element may be more important than the DOM tree sub-structure of the other, priority is given via that attribute: the "domBuilding" attribute value of the more important <div> element is set to 2 while the "domBuilding" attribute value of the other is set to 1.

According to processing constraints (e.g. available memory), the decision engine 13 may then give priority for storing certain parsed elements, based on such attribute.

Such annotation enabling the processor to take a decision as described above, as well as any configuration information provided by the server in a specific configuration stream, may be determined on analysing the scripts implemented in the structured document. This may be done by the server storing the structured document 10 before providing it to a user device, or by the user device (i.e. the processor according to the invention) during a previous access to the scripts.

For a tree-based rendering, those scripts generally use DOM APIs to manipulate the DOM tree. Therefore the above analysis may consist in parsing the scripts to identify the DOM function calls, and then in studying those calls to determine (by the element names, attribute names, element ids or XPath expressions used in those calls) the structured elements and corresponding tokens which have to be stored in the DOM tree.

For example, the analysis may identify the functions retrieving elements by ID or by names. In that case, the tokens relating to DOM nodes having those ID or names should be built as DOM nodes in the DOM tree, and not discarded. A "domBuilding" attribute with a positive value should therefore be associated with those tokens.

Finer analysis of a set of function calls may also be done when several DOM function calls are used to navigate through the DOM tree.

This analysis may result in a set of simple XPath expressions that can be evaluated in a streaming mode against the HTML document.

This XPath streaming evaluation may be done by the server to generate the annotations that are then inserted in the structured document.

The set of XPath expressions can also be communicated independently so that each document that includes the script can be evaluated against the XPath expression set. In that case, the deciding is based on an XPath expression included in the structured document that identifies structured data for which the corresponding token (i.e. parsed element TK) is required to be stored. This is for example illustrated with reference to FIGS. 5a-5c.

FIG. 5a shows a structured document 10 containing a reference to a script file, and FIG. 5b presents the content of the script. This script modifies two node sets: the first node set includes the first child of an element with the id equal to "container"; the second node set comprises the "circles" elements.

FIG. 5c shows the same structured document 10 that is enriched with XPath expressions added within the @xpath-notes attribute to select those two sets.

The XPath expressions can be evaluated while processing the structured document to select which tokens and corresponding DOM nodes are to be built or not.

Another approach for said decision process may be based on heuristics performed on the structured document. The heuristics, i.e. experience-based rules, are used to identify elements that require or do not require a corresponding DOM tree sub-structure in the DOM tree.

For instance, the rules to avoid storage may determine the structured elements that are not understood by the rendering processor 1, such as extension language or metadata content, or that are rarely modified by the rendering application, such as all children of the <head> element.

The rules to decide storage may also determine the structured elements of the document 10 that are also referred to in scripts embedded therein. For example, container elements (HTML <span> element or SVG <g> element) do not generally require a corresponding DOM tree sub-structure in the DOM tree DTree as long as they are not manipulated by the embedded scripts.

The heuristic analysis may be done on a given element or on a whole document to check for the use of scripts or CSS so as to refine the decision engine algorithms.

When no script or CSS information is used for the document, it can be decided that DOM nodes for the parsed tokens are not built by default in the DOM tree.

If CSS is used and the CSS selectors are known at the time of processing the document 10, it can be decided which nodes are built:

- if all CSS selectors can be evaluated using the parsed data alone (i.e. the parsed tokens), it is decided not to build DOM nodes that would be used only for style matching. Generally, the widely used CSS selectors of CSS 16 can be evaluated directly from the parsed data alone. They are simple enough not to require a DOM tree to correctly resolve them and attach them to the corresponding elements;
- on the contrary, if some CSS selectors cannot be fully evaluated based on the parsed data alone, some DOM nodes are required to be built so as to evaluate the CSS selectors, i.e. to resolve the CSS rules and attach the right CSS rules to the right render sub-structures of RTree.

Rules for determining those cases by analysis the CSS complexity may be provided to determine for which potentially selected elements a DOM tree sub-structure should be built.

Another example of information based on which the decision process may be performed is a piece of information specifying that all the structured data of the parsed element are also stored in the render tree. This may apply if the render tree building unit 18 has processed the parsed element before the decision (whether or not to store the parsed element in the DOM tree) is taken.

This is because it is not worth storing the same information twice.

The deciding may also be based on history information relating to a previous rendering of said structured document. For example, a list of the items that were modified in the DOM tree during the previous rendering may have been refined during that previous rendering and then stored at the end of the rendering. Next, this list or any other history configuration information can be used to define the items that are to be stored again for the new rendering.

The approach based on history information may be enriched by assigning priorities to the DOM nodes (i.e. the structured data of the parsed elements) of the DOM tree. This assignment is performed during the previous rendering, for example by marking differently the DOM nodes needed at the beginning of the document rendering and those needed at the end. This priority configuration information may then be useful to schedule properly DOM node building tasks for the next rendering of the same document.

Figure 6:
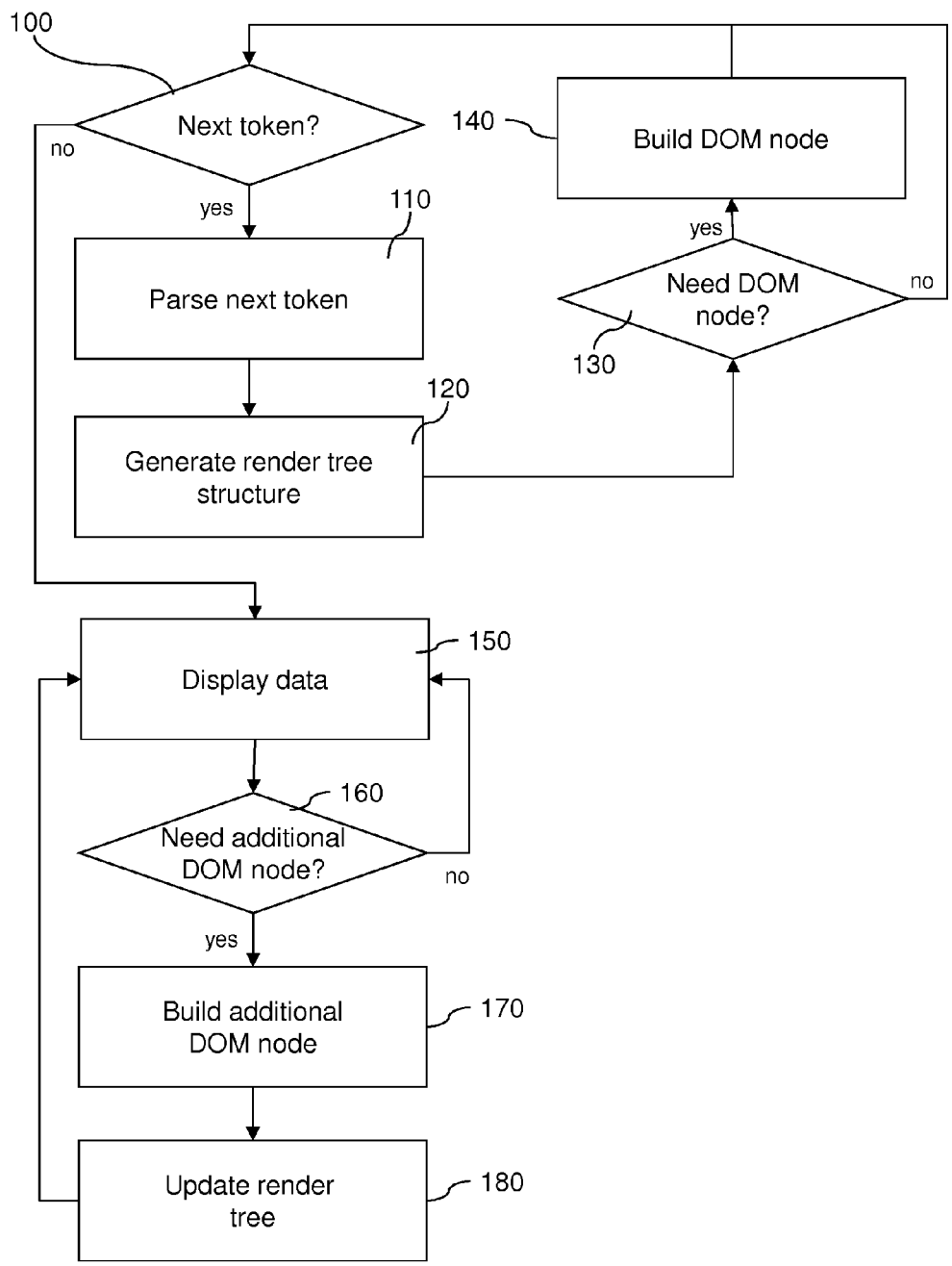
FIG. 6 shows generals steps according to the invention for jointly building a DOM tree and a render tree.

FIG. 6 shows generals steps according to the invention for jointly building the DOM tree DTree and the render tree RTree, before enabling updating of the DOM tree when DOM nodes missing from the DOM tree are required.

The process starts by retrieving the structured document 10 to render and then parses it into tokens TK of structured data (step 100 and 110).

For each parsed token TK, a render tree sub-structure (i.e. one or several nodes of RTree corresponding to the considered token) is built by the render tree building unit 18, possibly using stylesheets 16, and is added to the render tree RTree at step 120.

The render tree sub-structure of the parsed token TK stores all information required to perform the rendering of that token. It does not store information that is not related to the rendering.

To optimize memory consumption, the information is stored in the most efficient way to save memory, for example using data type. For instance, the render tree sub-structure of the token <circle r="100" cx="100" cy="100"> can store all attributes as integer values and not as string values. Determining the storage format may be straightforward if the underlying format of the structured data of the parsed token already specifies it: for example in EXI compression mode, the channel values may already store the values as floats or integers.

No string conversion is then required during the parsing operation.

Once the render tree sub-structure is generated for the parsed token TK, the process continues by checking whether that token requires being stored within the DOM tree (step 130).

This step is performed by the decision engine 13 based on information, as described above.

If it is decided to store the current parsed token TK, the structured data of that token is added within the DOM tree, as one or several DOM nodes (step 140).

Compared to step 120, all the structural information of the token TK is stored in that step 140. That is why the present invention, by minimizing the number of DOM nodes to store, significantly reduces memory consumption.

As an alternative, step 120 can be performed in parallel with steps 130/140 since those two operations only need to read the structured data of the parsed token TK (obtained at step 110).

As another alternative, step 120 may follow steps 130/140. If it is decided to store the parsed token in the DOM tree, this is done at step 140 and then the corresponding render tree sub-structure is evaluated based on the DOM tree for example, and the render tree sub-structure is stored in the render tree RTree at step 120.

If it is decided not to store the parsed token, step 120 directly follows the output "no" of test 130.

As soon as the whole structured document 10 has been parsed, it can be fully rendered at step 150 by the draw and display engine 20.

In a variant that reduces the time for the data to be displayed, the rendering process 150 by the draw and display engine 20 may start as soon as the render tree building process starts: each time a new piece of information is stored in the render tree RTree, it may be actually rendered on the user display.

During rendering of the document 10, a user may interact with that rendering. This user input may generate a query to the DOM tree DTree representing the rendered document. Inputs from other sources (e.g. third party application, network, etc.) may also involve querying the DOM tree. A query on the DOM tree can be seen as a request requiring access to the DOM tree.

Some queries may leave the DOM tree unchanged.

Some others may modify the DOM tree at nodes already stored. Modification of the DOM tree may comprise adding, removing, updating, moving, animating and hiding DOM nodes. In that conventional case, due to synchronization of the render tree RTree with the DOM tree DTree, the render tree is updated based on the modification, and then the rendering (display) is also updated.

However some queries may modify the DOM tree at nodes that are missing or partially missing (i.e. some information is missing from those nodes).

In this respect, in response to a query input, the process checks, at step 160, whether a missing node is needed.

If so, the missing DOM node is added to the DOM tree at step 170. This may be a new node in the DOM tree, or additional information provided to an already stored DOM node that was partially informed.

Several approaches to retrieve the information defining the missing nodes may be implemented. The approaches may be combined.

A straightforward approach consists in quickly reparsing the structured document 10 to get the tokens corresponding to the missing DOM nodes. However, this is a demanding approach due to the need to correctly locate the missing data in the document 10.

Another approach consists in verifying whether or not the missing information is already stored in the render tree RTree. This may be the case if all the missing information concerns content to render, in which case the corresponding render tree node may be marked as such.

Once the missing DOM nodes have been added to the DOM tree DTree, the render tree RTree is updated by the render tree building unit 18 at step 180. The update is automatically triggered due to the synchronization between the two trees. As a consequence of that update, the rendering (i.e. draw and display) is also updated for the user.

Figure 7:
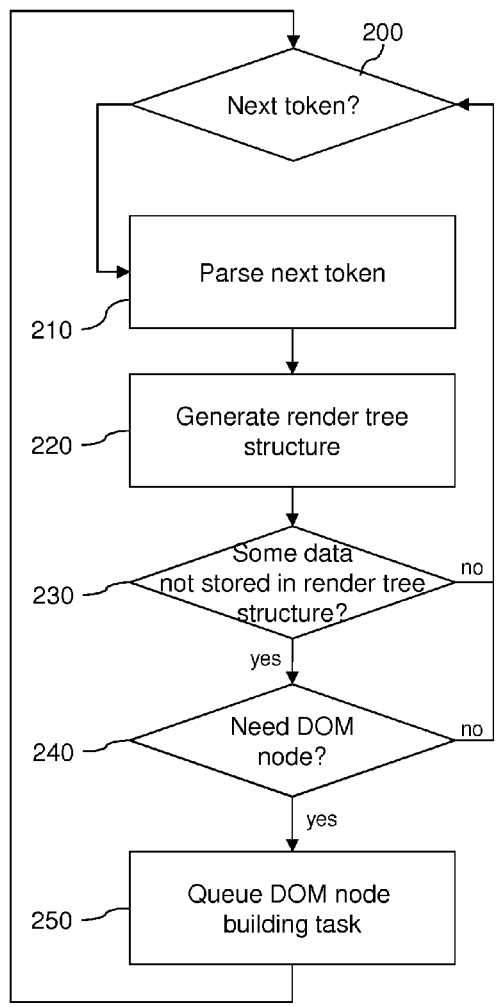
FIG. 7 shows more detailed steps for simultaneously building the DOM tree and the render tree according to an embodiment of the invention.

With reference to FIG. 7, a more detailed implementation of the steps 100 to 140 is now described.

Steps 200, 210 and 220 are similar to respectively steps 100, 110 and 120.

The process continues at step 230 by checking whether the render tree sub-structure of the current parsed token TK stores all the information of that token. As an example, the token <circle r="100" cx="100" cy="100"> has all its attribute values stored within the render tree.

For such token with all information stored in the render tree, no DOM node is actually required in the DOM tree since the corresponding DOM node or nodes may be easily generated if needed, based on the render tree sub-structure.

In this case, marking information specifying that all the structured data of the parsed are is also stored in the render tree is provided in that render tree, as already introduced above. This marking information is used to decide that a missing DOM node can be built or restored from the render tree RTree, without accessing the structured document 10.

In case all information of the token is stored in RTree (output "no" of test 230), the process goes back to step 200 to consider a next parsed token.

Otherwise, the process decides at step 240 whether a DOM node is required. Criteria to take the decision have been introduced above, for example annotations informed within the structured document 10 itself or in another data stream (e.g. the "domBuilding" attribute value of FIGS. 4a-4c), or history configuration information computed at the time of a first rendering, or heuristics based on the structured data if no other information is known in advance, etc.

Each time a DOM node is required, a DOM node building task is created and enqueued for processing at step 250.

This task may be scheduled according to priority (if any) assigned to the corresponding parsed token, for example within annotation information. The DOM tree building unit 14 processes this task to build the corresponding DOM tree sub-structure and to add it to the DOM tree DTree.

To optimize the DOM representation, only the DOM information that is not stored by the render tree RTree for the same token is actually stored as part of this task. This results in partial DOM nodes in the DOM tree DTree which are marked as such.

There may be several ways for the DOM tree building unit 14 to implement and build the DOM tree DTree. Two approaches are described here.

In the first one, the DOM tree DTree and the render tree RTree are separate independent tree structures. That means they are stored at two different memory locations. This solution is particularly appropriate for the case where the DOM tree is often queried (user interaction or any other input).

The DOM tree keeps the structure of the original structured document 10 for the token it stores.

Figure 8:
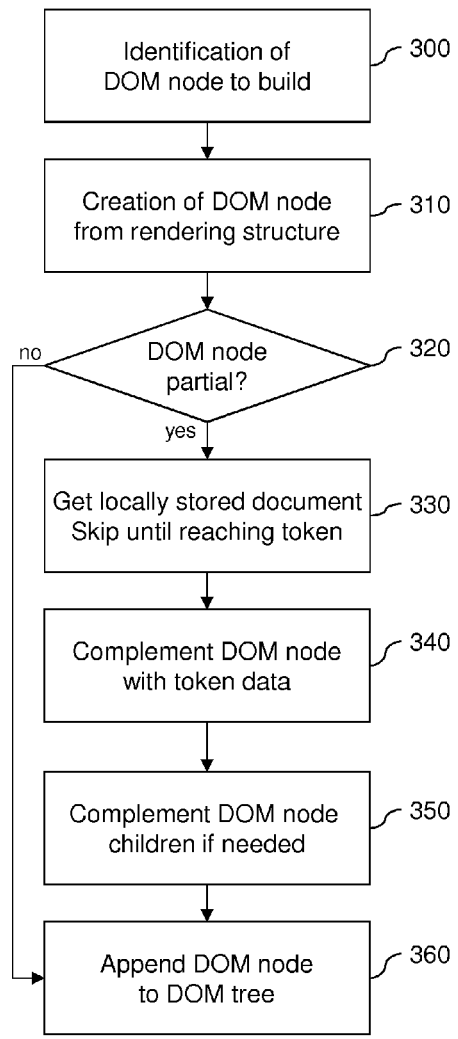
FIG. 8 illustrates an a posteriori reconstruction of queried DOM nodes according to an embodiment of the invention.

If no token is stored, the parent DOM node of the DOM tree is marked as partially informed so that when it is accessed, it triggers an a posteriori reconstruction of the queried DOM nodes as described below with reference to FIG. 8.

If a DOM node is added to the DOM tree (either at step 140 or at step 170 for example), all parent DOM nodes of it must be available in the DOM tree. If needed, those parent DOM nodes are created as empty DOM nodes and marked as partially informed. The DOM node is then added to its closest parent node.

The second approach to implement the DOM tree relies on enriching the render tree RTree with the DOM information (structured data to be stored in the DOM tree). This means that the DOM tree is stored within the render tree. Each node of the DOM tree is stored at the corresponding node of the render tree.

This minimizes the DOM memory overhead at the expense of slower access to the DOM tree. This approach is preferably used when the DOM tree is not often queried.

In this approach, for each token which has to be stored in the DOM tree, a corresponding DOM node or nodes are created and then associated with the corresponding node or nodes of the render tree RTree. If there is no corresponding node or nodes in the render tree, the DOM node or nodes are added to the closest parent node in the render tree as an indirect DOM child node.

The a posteriori reconstruction of DOM nodes or DOM tree is now described with reference to FIG. 8. This may arise when building a DOM node at step 140 or step 170 or step 250.

This occurs at step 170 when the parsing process has not taken the right decision as to whether or not to store a parsed token (i.e. whether or not to build the corresponding DOM node or nodes). This is because interactivity with the rendered document may require missing nodes.

The first step 300 is to identify the required DOM node to build.

That DOM node may be retrieved programmatically from a simple XPath expression or from the number of the DOM node starting from the root DOM node.

In case of a user interaction, the RTree node concerned by the interaction (i.e. a node of the render tree) is identified by the rendering process and that RTree node identifies the corresponding DOM node.

A partial DOM node is then built, from the identified node of the render tree, at step 310. This means that any information available in the render tree for that DOM node is stored the DOM node.

The status of the DOM node is marked as partially informed or fully informed depending on information retrieved from the render tree RTree. For example, the RTree node may be marked if it comprises all the structural information of the corresponding token, in which case the DOM node built from that RTree node is fully informed.

If there is no RTree node available for the required DOM node, an empty DOM node is created and added to the DOM tree, and marked as partially informed.

In case the DOM node is marked as partially informed (test 320), there is a need to complement it based on the structured document 10. To do so, the processor, and more particularly the DOM tree building unit 14, retrieves the missing information from the locally stored document 10.

Then, at step 330, the structured document 10 is parsed until the first token corresponding to the required node is reached.

The missing information for the required DOM node is then retrieved and added to the DOM node in the DOM tree, at step 340.

The process recursively processes the DOM child nodes if needed, at step 350. For example, DOM child nodes may be needed if the rendering application actually interacts with the DOM child nodes.

Next at step 350 or if the required DOM node is fully informed at step 310 (output "no" of test 320), the required DOM node is appended to the DOM tree at the right location within the DOM tree to keep the structure of the original structured document 10.

Figure 9:
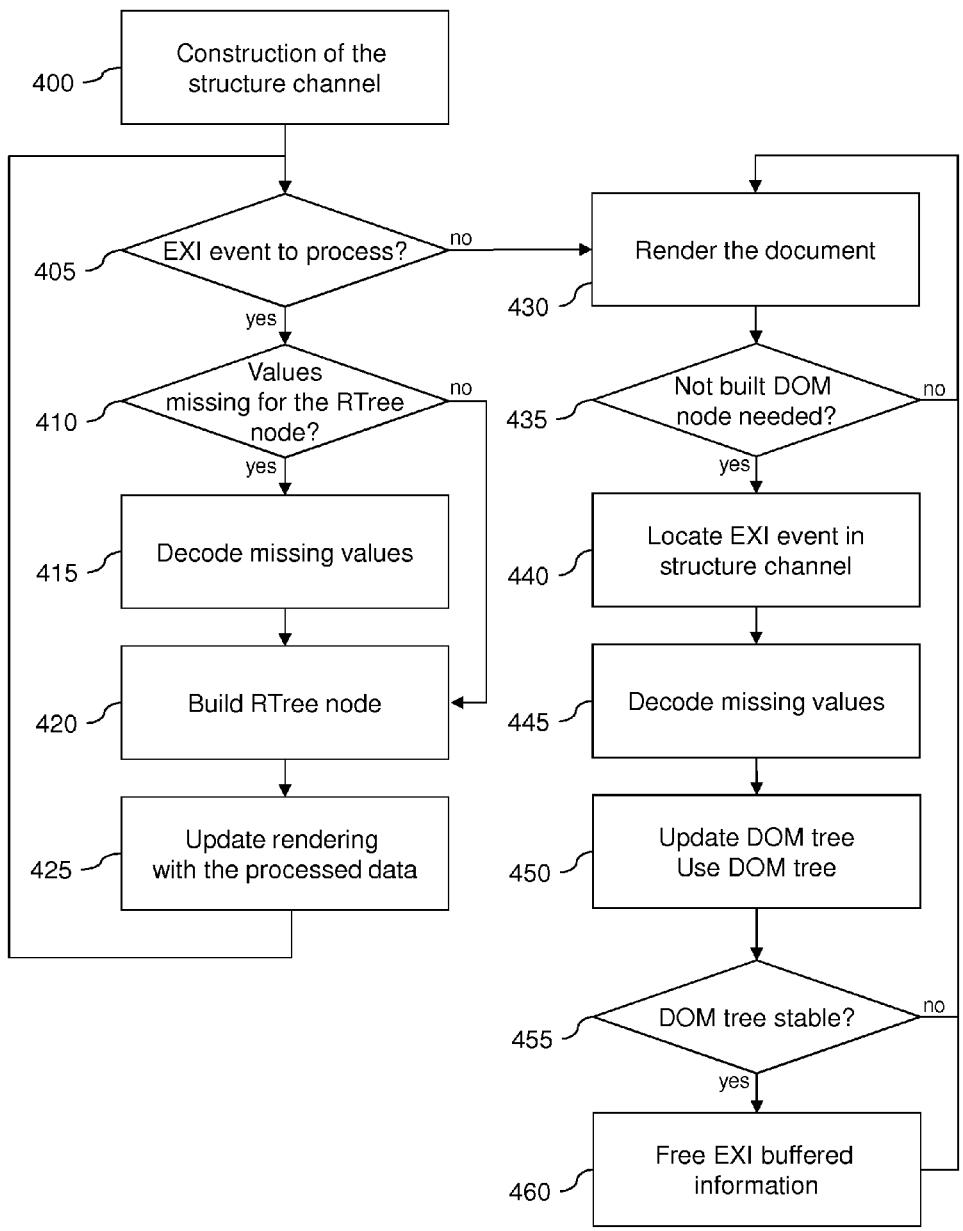
FIG. 9 illustrates an example of rendering processing according to the invention based on an EXI bitstream encoded using the EXI compression mode.

FIG. 9 deals with a case where the structured document, an HTML page, is provided in an EXI encoded format for rendering. With reference to this Figure, a way to independently build the DOM tree DTree and the render tree RTree is explained.

EXI encoded format, in particular using the above introduced compression mode, may provide encoded type values, for example each value channel is associated with a type taken by all its values. The EXI decoder (implemented in the same device as the processor according to the invention, for example) may then provide to the processor 1 the type values without conversion to XML strings. This allows gains in terms of processing speed.

The EXI compression mode also requires the decoder to store the list of all EXI events (from the structure channel) to decode correctly all the values of the document. This list of EXI events may be used advantageously by the processor 1 of the invention to build the DOM nodes independently from the render tree.

In addition to that, since not all values may be of interest for the rendering, a whole group of values (e.g. a whole value channel) may be skipped at once, i.e. disregarded. This is for example the case for all values of the HTML attribute 'alt' (image describing attribute) since that attribute does not concern content rendering.

The processing algorithm based on EXI compressed bitstreams starts at step 400 by conventionally decoding the structure channel and storing the decoded information as a list of EXI events.

Then at step 405, the process iterates on each EXI event of the list to decode the corresponding values.

For each EXI event, it is checked whether values relating to the content to render, i.e. used by the render tree RTree, are missing (step 410). This is because some value channels may have been already decoded when processing previous EXI events.

If this is the case, the missing values are decoded by decoding the corresponding value channels (step 415).

Values of different value channels may be required. In that case, the simplest way is to decode all needed value channels, although partial value channel decoding may also be done.

Once all values needed for the render tree are decoded and obtained, the RTree node or nodes of the render tree are built at step 420, and the display is updated at step 425 to enable incremental display of the data to render.

It may be noted that when CSS information 16 is available during the decoding of the EXI structure channel, pre-processing may be performed to achieve partial matching of the CSS selectors on the decoded structure. This pre-processing helps reduce the final CSS selector matching and can be done in parallel with the EXI data remaining to decode.

It may also be noted that, since the EXI compression mode groups all 'class' and 'id' values in specific value channels, when these channels are being decoded, all their values can be directly passed to the CSS selectors to refine CSS selector matching. In particular, some CSS selectors are only based on class or id information and can be directly matched from each value channel taken as a whole.

Once all EXI events have been processed (output "no" of test 405), the render tree RTree is finalized for the document.

However, if there is CSS information 16 to apply to the document that was not available at the start of the decoding process, the stored EXI events are used to apply the CSS information correctly to the render tree RTree in order to finalize it.

In particular, EXI events may be traversed to select the CSS rules to apply to each RTree node.

In case the CSS rules are too complex, DOM nodes may be built from the EXI events (as described below with reference to steps 440-460) so as to resolve CSS selectors.

The document is then rendered based on the finalized render tree RTree at step 430.

This rendering may trigger the need to access some DOM nodes that were not built (test 435).

For instance, as introduced above, some user actions may trigger the execution of scripts that access specific DOM nodes.

In that case, the first EXI event of the accessed DOM node is located in the structure channel at step 440. This location operation is carried out based on the knowledge of the parents of the accessed DOM node or on a given index of that stored EXI event.

All values of the accessed DOM node are decoded if needed at step 445, so as to build the missing DOM node.

At step 450, the built DOM node is then inserted into the DOM tree and used by the rendering application (i.e. accessed).

It should be noted that, contrary to DOM nodes inserted by the rendering application, this insertion does not trigger any DOM event.

At some point during the rendering, the DOM tree is stabilized. This happens for different reasons: the whole DOM tree is loaded into memory or the structured document is no longer rendered and is only kept in cache memory as history, or no modification of the rendered document has been made for a given amount of time.

In that case, the EXI structure that was generated during the decoding (i.e. the structure channel and buffered channel values) is deleted at step 860, freeing memory.

Reducing the amount of used memory is an important issue.

The invention also provides mechanisms to achieve such reduction when the rendering of the structured document ends and the DOM tree is transferred into a cache memory.

This particularly applies to the context of a web browser. This is because web browsers keep documents already rendered in cache memory to allow users to go back very quickly to a previously displayed web page. However, this significantly increases the amount of memory needed.

Figure 10:
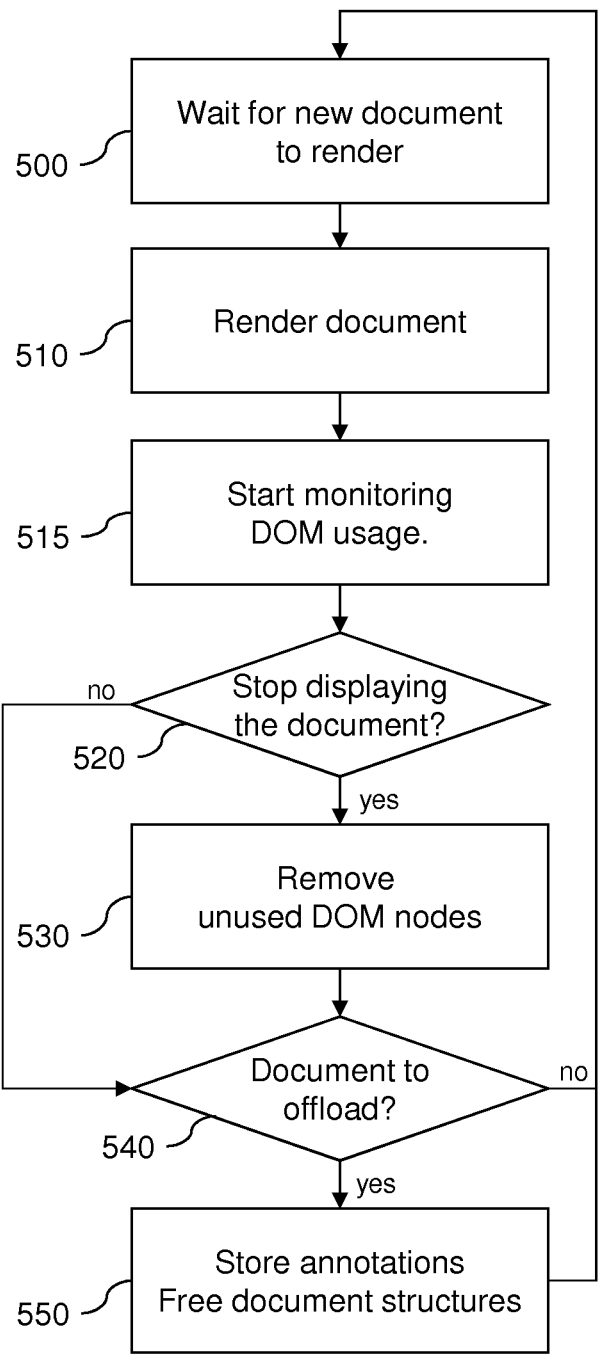
FIG. 10 illustrates an implementation of memory management by monitoring the use of DOM nodes, according to an embodiment of the invention.

With reference to FIG. 10, a mechanism to optimize the cache memory use is provided. In short, the process provides the following steps:

monitoring use of the DOM nodes within the DOM tree during rendering (e.g. display) of the structured document; and when the rendering of the structured document ends, removing structural data from unused monitored DOM nodes of the DOM tree before storing that DOM tree in the cache memory.

In this approach, the DOM nodes that are not necessary (identified through monitoring) are deleted. It is assumed that during a potential next rendering those DOM nodes will no longer be necessary.

The process of FIG. 10 starts at step 500 by waiting for a new document to render.

The document is then rendered at step 510 using any of the mechanisms of the invention as described above. The usage of the DOM nodes is monitored at step 515.

The monitoring can be carried out according to the process described above with reference to FIG. 6: for example, only the DOM nodes needed for the rendering or the interaction with the rendering application are built. If all DOM nodes are built at parsing time, all DOM events (insertion, deletion, modification from the scripts) are identified so as to identify which DOM nodes need to be kept or not.

When the rendering ends (e.g. the display is stopped) (test 520), the DOM nodes that have been identified as unused during the monitoring of step 515 (neither read nor modified) are removed from the DOM tree at step 530.

This reduces the memory used to store the document.

At step 540 it is determined whether memory should be freed. This test can be performed after the removal of the unused DOM nodes but also on currently rendered documents, as soon as the memory consumption exceeds a threshold value.

In that case, the document can be entirely offloaded from the memory at step 550: the document files are stored in a secondary memory area (the file cache typically) as well as annotations that are useful to reload the document quickly.

The whole DOM tree is then deleted, as well as the render tree RTree if the document is no longer displayed.

With reference to FIG. 11, a description is now given by way of example of a particular hardware configuration of a device comprising the processor according to the invention for an implementation of the processing method according to the invention.

A processing device implementing the present invention is for example a micro-computer 50, a workstation, a personal digital assistant, or a mobile telephone connected to different peripherals. According to another embodiment of the invention, the processing device takes the form of a camera provided with a communication interface to enable connection to a network.

The peripherals connected to the processing device comprise for example a digital camera 64, or a scanner or any other means of image acquisition or storage, connected to an input/output card (not shown) and supplying multimedia data to the processing device.

The device 50 comprises a communication bus 51 to which there are connected:

a central processing unit CPU 52 for example in the form of a microprocessor;

a read only memory 53 in which may be contained the programs whose execution enables the implementation of the method according to the invention. It may be a flash memory or EEPROM;

a random access memory 54, which, after powering up of the device 50, contains the executable code of the programs of the invention necessary for the implementation of the invention. As this memory 54 is of random access type (RAM), it provides fast access compared to the read only memory 53;

a screen 55 for displaying data and/or serving as a graphical interface with the user, who may thus interact with the programs according to the invention, using a keyboard 56 or any other means such as a pointing device, for example a mouse 57 or an optical stylus;

a hard disk 58 or a storage memory, such as a memory of compact flash type, able to contain the programs of the invention as well as data used or produced on implementation of the invention;

an optional diskette drive 59, or another reader for a removable data carrier, adapted to receive a diskette 63 and to read/write thereon data processed or to process in accordance with the invention; and a communication interface 60 connected to the telecommunications network 61, the interface 60 being adapted to transmit and receive data.

The communication bus 51 permits communication and interoperability between the different elements included in the device 50 or connected to it. The representation of the bus 51 is non-limiting and, in particular, the central processing unit 52 unit may communicate instructions to any element of the device 50 directly or by means of another element of the device 50.

The diskettes 63 can be replaced by any information carrier such as a compact disc (CD-ROM) rewritable or not, a ZIP disk or a memory card. Generally, an information storage means, which can be read by a micro-computer or microprocessor, integrated or not into the device, and which may possibly be removable, is adapted to store one or more programs whose execution permits the implementation of the methods according to the invention.

The executable code enabling the encoding or decoding device to implement the invention may equally well be stored in read only memory 53, on the hard disk 58 or on a removable digital medium such as a diskette 63 as described earlier. According to a variant, the executable code of the programs is received by the intermediary of the telecommunications network 61, via the interface 60, to be stored in one of the storage means of the device 50 (such as the hard disk 58) before being executed.

The central processing unit 52 controls and directs the execution of the instructions or portions of software code of the program or programs of the invention, the instructions or portions of software code being stored in one of the aforementioned storage means. On powering up of the device 50, the program or programs which are stored in a non-volatile memory, for example the hard disk 58 or the read only memory 53, are transferred into the random-access memory 54, which then contains the executable code of the program or programs of the invention, as well as registers for storing the variables and parameters necessary for implementation of the invention.

It will also be noted that the device implementing the invention or incorporating it may be implemented in the form of a programmed apparatus. For example, such a device may then contain the code of the computer program(s) in a fixed form in an application specific integrated circuit (ASIC).

The device described here and, particularly, the central processing unit 52, may implement all or part of the processing operations described in relation with FIGS. 2 to 10, to implement the processing method of the present invention and constitute the processor of the present invention.

The preceding examples are only embodiments of the invention which is not limited thereto.

The invention claimed is:

1. A method for processing a structured document to render, comprising:
   parsing the structured document into parsed tokens of structured data;
   constructing a first tree structure storing the structured data of parsed tokens;
   constructing a render tree structure storing the document content to render, said render tree structure being synchronized with the first tree structure; and
   having a draw and display engine operating upon the render tree structure to render the structured document on a display device,
   wherein: (i) constructing the first tree structure comprises deciding, for each parsed token, whether or not the parsed token is to be stored in said first tree structure, and storing the structured data of the parsed token therein only in case of a positive decision; (ii) the whole render tree structure is constructed directly from the parsed tokens; (iii) the structured document is initially compressed in a structure channel and value channels, and the tokens are parsed from the structure channel; and (iv) the value channels group together values of structured data having the same qualified name, and the method further comprises disregarding a whole group of values from being stored in the render tree structure based on the corresponding qualified name.

2. The processing method of claim 1, further comprising, in response to receiving a request requiring access to structured data of a token missing from the first tree structure:
   retrieving the structured data of the missing token,
   updating the first tree structure to store the retrieved data of the missing token.

3. The processing method of claim 2, wherein the structured data of the missing token is retrieved from the render tree structure.

4. The processing method of claim 3, wherein, if it is decided not to store a parsed token in the first tree structure and the entire structured data of that missing parsed token is stored in the render tree structure, constructing the render tree structure comprises marking that structured data stored in that render tree structure as fully informed.

5. The processing method of claim 4, wherein a decision for retrieving the structured data of the missing token from the render tree structure is based on the presence of marking information associated with the structured data of the missing token in the render tree structure.

6. The processing method of claim 2, wherein the structured data of the missing token is retrieved directly from the structured document.

7. The processing method of claim 2, further comprising updating the rendering of the structured document if the render tree structure is modified due to synchronization with the updated first tree structure.

8. The processing method of claim 1, wherein, for each parsed token of structured data, the data stored in the first tree structure is complementary to the content information of the structured data stored in the render tree structure.

9. The processing method of claim 8, wherein, when content information is present in the render tree structure for a parsed token, the data stored in the first tree structure for that parsed token is marked as partially informed.

10. The processing method of claim 1, wherein the first tree structure and the render tree structure are separate independent structures.

11. The processing method of claim 10, wherein, for each token stored in the first tree structure, that structure comprises a node for every token that is structurally parent of said stored token.

12. The processing method of claim 11, wherein the node of a parent token not stored in the first tree structure is an empty node marked as partially informed.

13. The processing method of claim 11, wherein, in the first tree structure, a parent node of a token not stored in that structure is marked as partially informed.

14. The processing method of claim 1, wherein the first tree structure is stored within the render tree structure.

15. The processing method of claim 1, wherein the value channels group together values of the structured data of the structured document, and the method further comprising preprocessing a style sheet and associating a rendering style with a group of value channels at the same time.

16. The processing method of claim 1, further comprising:
monitoring use of nodes within the first tree structure during rendering of the structured document; and
when the rendering of the structured document ends, removing structural data from unused monitored nodes of the first tree structure before storing that first tree structure in a cache memory.

17. The processing method of claim 1, further comprising:
monitoring use of nodes within the first tree structure during rendering of the structured document; and
in response to a request to reduce memory consumption, removing structural data from nodes of the first tree structure based on the monitored use.

18. The processing method of claim 1, wherein the deciding is based on an annotation associated with the parsed token in the structured document.

19. The processing method of claim 18, wherein the annotation is an attribute, in the structured document, of an element comprising the structural data of the parsed token, said attribute specifying whether or not storing of the structural data of said element within the first tree structure is required.

20. The processing method of claim 1, wherein the deciding is based on an XPath expression included in the structured document that identifies structured data for which the corresponding token is required to be stored.

21. The processing method of claim 1, wherein the deciding is based on heuristics performed on the structured document.

22. The processing method of claim 1, wherein for a particular token among the parsed tokens, the decision to store the particular token is based upon a likelihood that the particular token will be modified.

23. The processing method of claim 1, wherein the deciding is based on history information relating to a previous rendering of said structured document.

24. The processing method of claim 1, wherein the first tree structure comprises a document object model tree.

25. The processing method of claim 1, wherein the structured document comprises a web document written in a markup language.

26. A processor for processing a structured document to render, comprising:

a parser configured to parse a structured document to render into parsed tokens of structured data;

a tree structure building unit configured to construct a first tree structure storing the structured data of parsed tokens;

a decision engine configured to decide, for each parsed token, whether or not the parsed token is to be stored in said first tree structure;

a tree structure building unit configured to construct a render tree structure storing the document content to render, said render tree structure being synchronized with the first tree structure; and a draw and display engine configured to operate upon the render tree structure to render the structured document on a display device, wherein: (i) the processor is configured to store the structured data of the parsed token in the first tree structure only in case of a positive decision from the decision engine; (ii) the whole render tree structure is constructed directly from the parsed tokens; (iii) the structured document is initially compressed in a structure channel and value channels, and the tokens are parsed from the structure channel; and (iv) the value channels group together values of structured data having the same qualified name, and the processor is further configured to disregard a whole group of values from being stored in the render tree structure based on the corresponding qualified name.

27. A non-transitory computer-readable medium storing a program which, when executed by a microprocessor or computer system in an apparatus, causes the apparatus to perform the steps of:

parsing a structured document to render into parsed tokens of structured data;

constructing a first tree structure storing the structured data of parsed tokens;

constructing a render tree structure storing the document content to render, said render tree structure being synchronized with the first tree structure; and rendering the structured document based on the render tree structure by having an application operate upon the render tree structure, wherein: (i) constructing the first tree structure comprises deciding, for each parsed token, whether or not the parsed token is to be stored in said first tree structure, and storing the structured data of the parsed token therein only in case of a positive decision; (ii) the whole render tree structure is constructed directly from the parsed tokens; (iii) the structured document is initially compressed in a structure channel and value channels, and the tokens are parsed from the structure channel; and (iv) the value channels group together values of structured data having the same qualified name, and the steps further comprising disregarding a whole group of values from being stored in the render tree structure based on the corresponding qualified name.

* * * * *